3,413,365
PROCESS FOR THE MANUFACTURE OF DICHLOROBUTENE MIXTURES FOR DEHYDROCHLORINATION INTO 2-CHLOROBUTADIENE-(1,3)
Kurt Sennewald, Knapsack, near Cologne, Herbert Baader, Hermulheim, near Cologne, Klaus Gehrmann, Knapsack, near Cologne, Laszlo Lugosy, Frankfurt am Main, Wilhelm Vogt, Knapsack, near Cologne, and Günther Viertel, Bruhl, near Cologne, Germany, assignors to Knapsack Aktiengesellschaft, Knapsack, near Cologne, Germany, a corporation of Germany
No Drawing. Filed Oct. 18, 1966, Ser. No. 587,434
Claims priority, application Germany, Nov. 17, 1965, K 57,687
7 Claims. (Cl. 260—654)

ABSTRACT OF THE DISCLOSURE

Preparing dichlorobutenes by heating 1,2,3-trichlorobutane in the presence of at least one catalyst comprising trialkyl phosphine, triarylphosphine, their corresponding hydrochlorides and quaternary phosphonium chlorides to a temperature varying between about 130 and 170° C. and removing the resulting hydrogen chloride and the dichlorobutene products by distillation.

---

The invention relates to a process for the manufacture of a mixture formed substantially of 1,2-dichlorobutene-(2), 1,3-dichlorobutene-(2) and 2,3-dichlorobutene-(1) by subjecting 1,2,3-trichlorobutane or a mixture containing 1,2,3-trichlorobutane to dehydrochlorination, at a temperature higher than 100° C. The above dichlorobutenes are known to be starting materials which can be dehydrochlorinated further to obtain 2-chlorobutadiene-(1,3). When subjected to pyrolysis, they chiefly produce 2-chlorobutadiene-(1,3) in addition to a very small proportion of undesirable 1-chlorobutadiene-(1,3).

The chlorination of butene-(2) results in the formation of 2,2,3-trichlorobutane readily transformable into 2-chlorobutadiene-(1,3) and in addition thereto in the formation of a considerable quantity of 1,2,3-trichlorobutane which on being pyrolized yields small amounts of 2-chlorobutadiene-(1,3) and undesirable 1-chlorobutadiene-(1,3).

U.S. Patent 2,879,311 describes a process for the dehydrochlorination of 1,2,3-trichlorobutane in the presence of a hydrochloride of a tertiary amine (e.g. pyridine hydrochloride) or quaternary ammonium chloride (e.g. 1-methylpyridinium chloride) as the catalyst with the resultant formation of a reaction mixture which contains 1,2-dichlorobutene-(2), 1,3-dichlorobutene-(2) and 2,3-dichlorobutene-(1). The amine used should have a pK-value varying between 3.0 and 9.0 and a boiling point varying between 110 and 250° C. (760 mm. mercury). The disadvantage associated with this process resides in the fact that the catalysts are required to be used in a proportion varying between at least 25 and more than 50% by weight, referred to the 1,2,3-trichlorobutane used. Furthermore, the catalysts become readily resinified and thus lose their activity. They must be removed then from the reaction mixture and replaced with fresh catalyst, which is an expensive procedure.

British Patent 944,084 also describes a process for the manufacture of dichlorobutene mixtures which can be subjected to pyrolytic dehydrochlorination to obtain 2-chlorobutadiene-(1,3). These mixtures are prepared by subjecting 1,2,3-trichlorobutane to dehydrochlorination with over-stoichiometric amounts of an alkali metal hydroxide or alkali metal oxide, at temperatures between 100 and 250° C. The dichlorobutene mixtures so obtained again contain 1,2-dichlorobutene-(2), 1,3-dichlorobutene-(2) and 2,3-dichlorobutene-(1). No free hydrogen chloride can be recovered in this process, and the very substantial amounts of useless alkali metal chlorides are required to be withdrawn.

The present invention now provides a process for the manufacture of a mixture formed substantially of 1,2-dichlorobutene-(2), 1,3-dichlorobutene-(2) and 2,3-dichlorobutene-(1) by subjecting 1,2,3-trichlorobutane and a mixture containing 1,2,3-trichlorobutane to dehydrochlorination at a temperature higher than 100° C., which comprises heating 1,2,3-trichlorobutane in the presence of a trialkyl or triaryl phosphine or a hydrochloride thereof or in the presence of a quaternary phosphonium chloride of thse compounds with 1,2,3-trichlorobutane as the catalyst to a temperature varying between about 130 and about 170° C., preferably between 160 and 167° C., and removing then hydrogen chloride and the resulting dichlorobutene mixture by conventional distillation. The catalyst should be used in a proportion varying between about 0.2 and about 35, preferably between 0.5 and 8 parts by weight, per 100 parts by weight of 1,2,3-trichlorobutane. The trialkyl phosphines used preferably include those which contain 4 to 18 carbon atoms per alkyl group. Mixtures of 1,2,3-trichlorobutane with tetrachlorobutanes, preferably with 2,2,3,3-tetrachlorobutane, can also be used. 2,2,3,3-tetrachlorobutane which may be present remains unchanged during the dehydrochloroination.

The following alkyl radicals can be used, for example, as the "alkyl" in the trialkyl phosphines: n-butyl, isobutyl, n-pentyl, n-hexyl, n-heptyl, n-octyl, n-nonyl, n-decyl, n-undecyl, n-dodecyl (lauryl), palmityl, stearyl and other isomeric or homologous alkyls. The trialkyl phosphines may contain up to 3 different alkyl groups. The triaryl phosphines preferably include triphenyl phosphine and the various tritolyl or trixylyl phosphines. The trialkyl or triaryl phosphines or their hydrochlorides or quaternary pohsphonium chlorides display true catalytic activity in the process of the present invention, and every molecule of the catalyst causes a plurality of 1,2,3-trichlorobutane molecules to undergo dehydrochlorination. The process of the present invention can be carried out by adding no more than a useful tertiary phosphine to the reaction mixture, hydrochlorides and quaternary phosphonium chlorides forming automatically in the presence of hydrogen chloride or 1,2,3-trichlorobutane.

The catalytic dehydrochlorination in accordance with the present invention was carried out by heating the reaction mixture to a temperature higher than 130° C. The reaction achieved by heating the reaction mixture should conveniently be carried out with reflux cooling and under atmospheric pressure, a temperature varying between 150 and 170° C., advantageously between about 160 and 167° C., being preferably used. A temperature increased to a value higher than 170° C. admittedly increases the reaction velocity, but it also favors the formation of undesirable polymers.

The dehydrochlorination velocity depends on the quantity of catalyst used, which may be varied accordingly. Maximum conversion rates are often obtained by adding no more than 0.5 part by weight of catalyst per 100 parts by weight of 1,2,3-trichlorobutane (cf. Example 2). When the reaction velocity increases, it is found that the maximum conversion rates are obtained upon the addition of 4 to 8 parts by weight of catalyst. Good conversion rates are even obtained with the addition of 32 parts of catalyst (cf. Examples 3 and 8), but polymerization is then found to occur with an increasing proportion of catalyst added (cf. Example 4) because more than 1 mol hydrogen chloride is then split off per mol 1,2,3-trichlorobutane.

The process of the present invention can be carried out in either continuous or discontinuous fashion. An apparatus suitable for continuous operation comprises a fractionating column disposed above a heated reactor charged with a mixture of 1,2,3-trichlorobutane and catalyst. The mixture is heated in the column with reflux and gaseous hydrogen chloride is isolated at the head of the column from the liquid refluxed, and withdrawn. When the temperature prevailing at the head of the column is found to drop and approach the boiling point of the dichlorobutenes produced, conveniently a temperature of 127° C., a portion of the head product is withdrawn at such a rate that the head temperature remains constant. The discharge rate can be regulated by hand or by means of an automatic device which has a temperature-sensitive element incorporated therewith and is disposed at the head of the column.

Fresh 1,2,3-trichlorobutane is simultaneously pumped into the reactor at such a rate that the reactor contains approximately a constant quantity of material charged thereinto.

The dehydrochlorination of the present invention results in the formation of dichlorobutenes which on being pyrolyzed chiefly produce 2-chlorobutadiene-(1,3). Dichlorobutenes which on being subjected to pyrolysis produce 1-chlorobutadiene-(1,3) are practically not contained in the product made in accordance with the present invention.

In the following examples the parts are parts by weight:

EXAMPLE 1

100 parts of a mixture formed approximately of 80% 1,2,3-trichlorobutane and 20% 2,2,3,3-tetrachlorobutane and 8 parts triphenyl phosphine were introduced into a reactor on which was placed a 1-metre packed column with a head outlet for low-boiling material. The mixture was heated under reflux, and the temperature of the reaction mixture increased from 160 to 170° C. 58 parts of liquid product were withdrawn at the head of the column, while 15.5 parts free hydrogen chloride were obtained simultaneously. The reaction product which had been distilled off was washed until free from hydrogen chloride, distilled once again and analyzed by gas-chromatography. The following results were obtained:

| Boiling range | Parts by weight | Approximate composition |
|---|---|---|
| 90–150° C | 46 | 22% 2,3-dichlorobutene-(1); 17% 1,3-dichlorobutene-(2); 60% 1,2-dichlorobutene-(2); 0.3% 2-chlorobutadiene-(1,3); 0.3% 1-chlorobutadiene-(1,3). |
| Residue | 5 | 1,2,3-trichlorobutane. |

The reactor was found to contain a further 3 parts 1,2,3-trichlorobutane. The rate of dehydrochlorination was found to be 14 parts of dichlorobutene mixture per hour, and the yield was 82.5%, referred to the conversion rate.

EXAMPLE 2

The process was carried out in the manner set forth in Example 1, but 0.5 part triphenyl phosphine was used. 59 parts of liquid product and 14.5 parts hydrogen chloride were withdrawn at the head of the column. The washed and redistilled reaction mixture was analyzed and the following results were obtained.

| Boiling range | Parts by weight | Approximate composition |
|---|---|---|
| 97–135° C | 46 | 55% 1,2-dichlorobutene-(2); 24% 1,3-dichlorobutene-(2); 20% 2,3-dichlorobutene-(1); 0.07% 2-chlorobutadiene-(1,3); 0.09% 1-chlorobutadiene-(1,3). |
| Residue | 5 | 1,2,3-trichlorobutane. |

The reactor was found to contain a further 3.8 parts 1,2,3-trichlorobutane. The rate of dehydrochlorination was found to be 2.5 parts of dichlorobutene mixture per hour, and the yield was 83.5%, referred to the conversion rate.

EXAMPLE 3

The process was carried out in the manner set forth in Example 1, but 32 parts triphenyl phosphine were used. 57 parts of liquid distillation product and 23 parts hydrogen chloride were obtained. The washed and redistilled reaction mixture was analyzed and the following results were obtained:

| Boiling range | Parts by weight | Approximate composition |
|---|---|---|
| 68–150° C | 40 | 54% 1,2-dichlorobutene-(2); 24% 1,3-dichlorobutene-(2); 19% 2,3-dichlorobutene-(1); 1.2% 2-chlorobutadiene-(1,3); 0.3% 1-chlorobutadiene-(1,3). |
| Residue | 9.8 | 1,2,3-trichlorobutane. |

The rate of dehydrochlorination was found to be 34 parts of dichlorobutene mixture per hour, and the yield was 73.5%, referred to the conversion rate.

EXAMPLE 4

The process was carried out in the manner set forth in Example 1, but 50 parts triphenyl phosphine were used. 16 parts of liquid distillation product boiling within the range of 72 to 93° C. and 47 parts hydrogen chloride were obtained within 8 hours. The liquid product was found to polymerize soon to give a solid substance.

The reactor was also found to contain only polymers.

EXAMPLE 5

100 parts of a mixture formed approximately of about 80% 1,2,3-trichlorobutane and 20% 2,2,3,3-tetrachlorobutane and 4 parts triphenyl phosphine were introduced into a reactor on which was placed a 1-metre packed column having a head outlet for low-boiling material. The mixture was heated under reflux and a portion of the refluxed material was withdrawn at the head of the column at a rate such that the temperature did not exceed 127° C. Fresh starting mixture was simultaneously pumped into the reactor at such a rate that the composition of the material in the still portion of the reactor remained constant. The temperature of the boiling reaction mixture was found to be 160–165° C. 2150 parts trichlorobutane were added in the course of 200 hours and 1262 parts of liquid distillation product and 360 parts hydrogen chloride were obtained.

The composition of the distillation product in percent was:

| | Percent |
|---|---|
| 1,2-dichlorobutene-(2) | 61.8 |
| 1,3-dichlorobutene-(2) | 20.5 |
| 2,3-dichlorobutene-(1) | 17.2 |
| 2,2,3,3-tetrachlorobutane | 0.3 |

The rate of dehydrochlorination was found to be 6.3 parts of dichlorobutene mixture per hour, and the yield was 94.2% of the theoretical.

EXAMPLE 6

The process was carried out in the manner set forth in Example 5, but 8 parts triphenyl phosphine were used. The same quantity of reaction product was obtained within 130 hours.

EXAMPLE 7

The process was carried out in the manner set forth in Example 1, but 4 parts trilauryl phosphine were used. 60 parts of liquid product and 20 parts hydrogen chloride were withdrawn at the head of the column. The composition of the reaction product in percent was:

| | Percent |
|---|---|
| 1,2-dichlorobutene-(2) | 53.4 |
| 2,3-dichlorobutene-(1) | 24.5 |
| 1,3-dichlorobutene-(2) | 17.3 |
| 2,2,3,3-tetrachlorobutane | 0.4 |

The rate of dehydrochlorination was found to be 2.3 parts of dichlorobutene mixture per hour, and the yield was 92.2 percent of the theoretical.

EXAMPLE 8

The process was carried out in the manner set forth in Example 1, but 32 parts trilauryl phosphine were used. 58 parts of liquid product and 21 parts hydrogen chloride were withdrawn at the head of the column. The composition of the product in percent was:

| | Percent |
|---|---|
| 1,2-dichlorobutene-(2) | 50.2 |
| 2,3-dichlorobutene-(1) | 26.4 |
| 1,3-dichlorobutene-(2) | 19.1 |
| 2,2,3,3-tetrachlorobutane | 0.2 |

The rate of dehydrochlorination was found to be 26 parts of dichlorobutene mixture per hour, and the yield was 93.5% of the theoretical.

EXAMPLE 9

The process was carried out in the manner set forth in Example 1, but 10 parts tributyl phosphine were used. 57 parts of liquid product and 20 parts hydrogen chloride were withdrawn at the head of the column. The composition of the product in percent was:

| | Percent |
|---|---|
| 1,2-dichlorobutene-(2) | 52.1 |
| 2,3-dichlorobutene-(1) | 25.2 |
| 1,3-dichlorobutene-(2) | 18.8 |
| 2,2,3,3-tetrachlorobutane | 0.3 |

The rate of dehydrochlorination was found to be 20 parts of dichlorobutene mixture per hour, and the yield was 88.5% of the theoretical.

EXAMPLE 10

The process was carried out in the manner set forth in Example 1, but 5 parts tri-p-tolyl phosphine were used. 59 parts of liquid product and 20 parts hydrogen chloride were withdrawn at the head of the column. The composition of the product in percent was:

| | Percent |
|---|---|
| 1,2-dichlorobutene-(2) | 53.0 |
| 2,3-dichlorobutene-(1) | 24.8 |
| 1,3-dichlorobutene-(2) | 17.8 |
| 2,2,3,3-trichlorobutane | 0.4 |

The rate of dehydrochlorination was found to be 11.5 parts of dichlorobutene mixture per hour, and the yield was 91.1% of the theoretical.

What is claimed is:

1. The process for the manufacture of a mixture formed substantially of 1,2-dichlorobutene-(2), 1,3-dichlorobutene-(2), and 2,3-dichlorobutene-(1) which comprises heating 1,2,3-trichlorobutane in contact with at least one catalyst selected from the group consisting of trialkyl phosphine, triaryl phosphine, their hydrochlorides and their quaternary phosphonium chlorides; to a temperature between about 130–170° C.; and removing hydrogen chloride and the dichlorobutene mixture by distillation.

2. The process of claim 1 wherein the reactants are heated to a temperature between 160–167° C.

3. The process of claim 1 wherein the catalyst is used in a proportion between about 0.2 and about 35 parts by weight per 100 parts by weight of 1,2,3-trichlorobutane.

4. The process of claim 1 wherein the catalyst is used in a proportion between about 0.5 and 8 parts by weight per 100 parts by weight of 1,2,3-trichlorobutane.

5. The process of claim 1 wherein the trialkyl phosphine catalyst contains 4 to 18 carbon atoms per alkyl group.

6. The process of claim 1 wherein the feed is a mixture of 1,2,3-trichlorobutane with tetrachlorobutane.

7. The process of claim 6 wherein the feed is a mixture of 1,2,3-trichlorobutane with 2,2,3,3-tetrachlorobutane.

References Cited

UNITED STATES PATENTS 3,188,357  6/1965  Blumbergs _____ 260—655

LEON ZITVER, *Primary Examiner.*

J. BOSKA, *Assistant Examiner.*

UNITED STATES PATENT OFFICE
CERTIFICATE OF CORRECTION

Patent No. 3,413,365                            November 26, 1968

Kurt Sennewald et al.

It is certified that error appears in the above identified patent and that said Letters Patent are hereby corrected as shown below:

Column 2, line 9, "and" should read -- or --.

Signed and sealed this 17th day of February 1970.

(SEAL)
Attest:

Edward M. Fletcher, Jr.                       WILLIAM E. SCHUYLER, JR.
Attesting Officer                               Commissioner of Patents